Nov. 16, 1965     M. J. P. BOGART     3,217,466
RECOVERY OF ETHYLENE OXIDE
Filed May 22, 1962
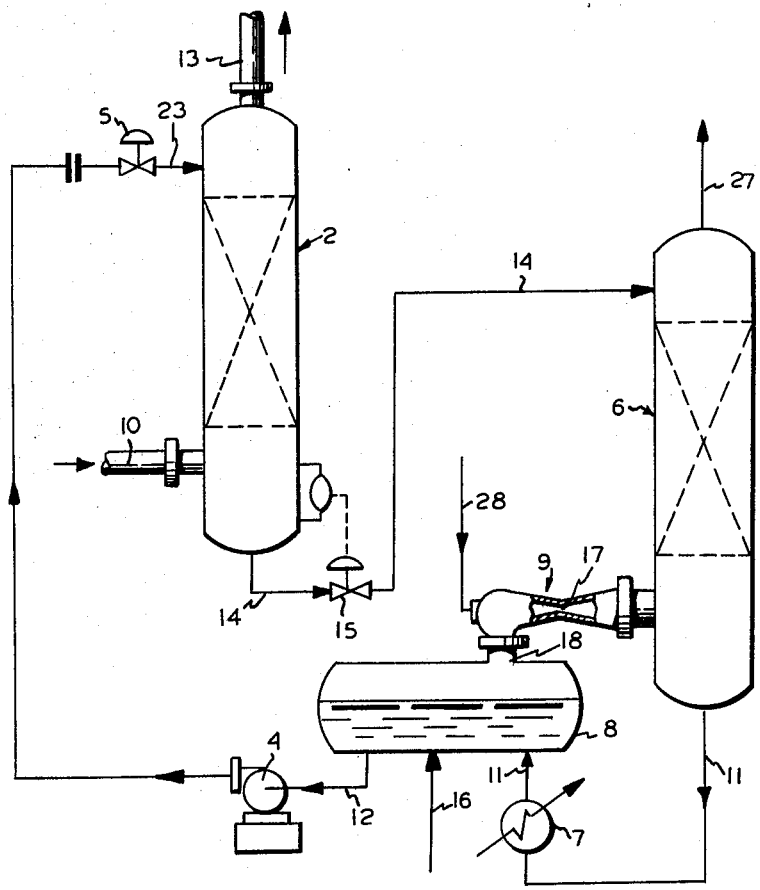
INVENTOR
MARCEL J. P. BOGART
BY
ATTORNEY

United States Patent Office 3,217,466
Patented Nov. 16, 1965

3,217,466
RECOVERY OF ETHYLENE OXIDE
Marcel J. P. Bogart, Stamford, Conn., assignor to The Lummus Company, New York, N.Y., a corporation of Delaware
Filed May 22, 1962, Ser. No. 196,806
6 Claims. (Cl. 55—44)

The present invention pertains generally to the recovery of valuable organic materials, especially ethylene oxide and the like, from gas mixtures containing the same, and more particularly pertains to the recovery of such materials from a gaseous mixture containing the same in an absorber and stripper circuit.

The present invention will be described with reference to the recovery of ethylene oxide, although the process is of general utility within the limitations hereinafter described.

The modern method for the manufacture of ethylene oxide involves the catalytic oxidation of ethylene, producing as the reactor effluent a gaseous mixture of ethylene oxide, unconverted ethylene, carbon dioxide, water, and whatever inerts were introduced with either the ethylene or the oxidant, such as nitrogen, argon, methane, and ethane. It is common practice in these plants to remove the ethylene oxide from this mixture of gases by absorption in water. While this process is the presently preferred procedure, it has various economic disadvantages arising from the relatively low boiling point of ethylene oxide, 51° F. Relatively large quantities of absorption water are required to accomplish a high degree of removal of the volatile ethylene oxide from the feed gases to the absorber. This is particularly true for plants installed in warm climates where the absorption water cannot be cooled to temperatures below 90° to 100° F. by conventional devices, such as cooling towers. The large circulation of water required by the resulting lowered solubility of ethylene oxide with increased temperature means large equipment sizes for the apparatus used to absorb and desorb the same. This leads to high cost of operation due to increased equipment costs and accompanying higher energy requirements.

It is well known that the efficiency of the absorption operations can be enhanced by increasing the pressure of absorption and/or reducing the temperature. In the subject case, the pressure of absorption is dictated by the reaction and processing steps preceding the absorption of ethylene oxide. In warm climates, the temperature of the absorption water can be reduced only by the introduction of refrigeration steps, which, can be justified only if the net result is a more economical operation.

An object of the present invention is to provide an improved method for the recovery of the organic materials, such as ethylene oxide, from gaseous mixtures such as those from the source indicated above.

Another object is to provide an improved method for removing ethylene oxide which is simple in arrangement and operation, and which is provided with a simple and economical refrigeration step.

With these and other objects in view, the present invention is based in part upon a conventional absorber and stripper circuit and includes the conventional circulation of absorbing medium, for example, water, through the absorber and stripper circuit for selectively removing ethylene oxide from a reactor effluent gas containing the same.

The conventional circuit is, however, modified to use refrigeration in an economical manner. Advantage is taken of the need for a stripping medium, such as steam, in the desorption or stripping step, wherein the ethylene oxide dissolved in the absorber bottoms, is stripped for removal therefrom in a countercurrent contactor. Instead of introducing the steam directly into the stripper as usual, the present invention first makes use of the steam as a prime mover in a steam-jet vacuum pump. This vacuum pump is used to provide refrigeration by maintaining a low pressure on a chilled water tank. For example, if the absorbent is water, maintaining a pressure of 0.25 p.s.i.a. in this chilled tank will result in flashing the inlet water to a final temperature of 60° F. This chilled absorbent is then sent to the absorber as the lean absorbent feed at a lower flow rate than if introduced at ambient temperature.

The decreased temperature and flow of the lean absorbent feed results in several benefits. The diameter of the absorber may be reduced due to the decrease in downflow area requirements of the tower. Also, an increase in ethylene oxide content of the absorber bottoms is experienced due to its increased solubility. Furthermore, a reduction in the size of the stripper tower is accomplished due to both the reduced quantity of feed liquid and its higher ethylene oxide concentration as well as a reduction in the size of ancillary equipment, such as pumps, heat-exchangers, piping, etc.

Further, a portion of the stripping steam requirement is furnished by the vaporization of warm water from the stripper bottoms in the chilled water tank in accomplishing the flash refrigeration of the absorption water, accordingly, less stripping steam need be produced in a steam-generating plant. The reduction in pressure of the lean absorbent flowing from the base of the stripper as it enters the chilled tank provides an additional processing step for reducing the ethylene oxide content of the lean absorbent before it is recirculated to the absorber tower. The ethylene oxide so released is passed through the ejector into the stripper tower, thereby providing another advantage in the present process.

The present invention may be further described in greater detail in connection with the accompanying drawing which illustrates a preferred embodiment thereof.

To recover the ethylene oxide, for example, as contained in a gaseous mixture comprising ethylene oxide, unconverted ethylene, carbon dioxide, water and inerts, the said gaseous mixture may be introduced through pipe 10 into an absorber tower 2, in which tower the gaseous mixture is counter-currently contacted with an absorbing medium, such as water, which may be introduced at or near the top of the tower through pipe 23.

The gaseous mixture is contacted with the absorbing medium in a manner and under conditions capable of removing substantially all of the ethylene oxide, the degree of removal being dependent on the proportion of absorbing medium to gaseous mixture at the temperature and pressure at which absortion takes place.

The residual unabsorbed gases are withdrawn from the tower 2 through a conduit 13. The enriched absorbing medium containing the ethylene oxide is withdrawn from the tower 2 through line 14 and is passed to a stripper tower 6. The flow of the enriched absorbing medium through line 14 is regulated by a liquid level control valve 15 which responds to the liquid level in the absorber tower 2. The ethylene oxide is stripped from the absorbing medium in stripper 6 and is withdrawn as product therefrom through line 27.

The stripper tower 6 is supplied with a stripping medium, such as steam, through line 28 and a jet ejector 9 which is connected with the stripper tower 6 at a point near the bottom thereof. The absorbing medium which has been stripped of the ethylene oxide content is withdrawn through line 11 from stripper 6 and is passed through cooler 7 into a collection zone such as chilled water tank 8. The absorbing water is passed from the tank 8 through line 12 by means of pump 4 to the top of the absorber tower 2. The flow in line 12 is controlled by valve 5.

Continuing now with a more detailed description of the chilled water tank 8 and the jet ejector 9, the tank 8 has a liquid inlet through line 11 and a liquid outlet through line 12. The tank 8 contains the cooled absorbing medium which is introduced into the absorber tower 2. Make-up absorbing medium may be introduced into tank 8 through line 16. The flow of absorbing medium through the tank 8 is regulated in any conventional manner to provide a body of fluid absorbent with a substantial surface area to permit evaporation or vaporization of residual ethylene oxide and a portion of the absorbent from this body. This evaporation or vaporization is simply and effectively achieved by the jet ejector 9 which affords a fluid jet directed through a restricted opening or nozzle 17 so as to create a vacuum or partial vacuum above the surface area of the fluid in the upper portion of the tank 8. The flow of the stream through line 28 and the jet ejector 9 pulls the vapor in tank 8 through the connecting conduit 18 to provide the partial vacuum, or vacuum, in tank 8. The liquid in tank 8 is cooled by the removal of the latent heat caused by the vaporization effected by the reduction of the pressure therein by the jet ejector 9 and the fluid jet formed by the steam passing through the nozzle 17.

While the invention has been described specifically for the recovery of ethylene oxide, it is broad in concept and can be used in other absorber-stripper cycles wherein water is used as the absorption medium, which permits the use of open steam in the stripping operation. Further, other vaporizable absorbents may be utilized in accordance with my invention, for example, if carbon tetrachloride were used as the absorbent, the jet ejector would be powered by carbon tetrachloride which is supplied as a vapor under suitable pressure.

It will be understood that the foregoing detailed description is by way of illustration only and that changes, omissions, additions, substitutions, and/or modifications may be made within the scope of the appended claims without departing from the spirit of the invention.

I claim:

1. A method for separating ethylene oxide from a gaseous mixture containing the same which comprises:
    (a) introducing said mixture into an absorption zone;
    (b) passing the mixture through said zone in countercurrent contact with an aqueous absorbent and absorbing said ethylene oxide in said absorbent;
    (c) withdrawing said enriched absorbent from said absorption zone;
    (d) introducing said enriched absorbent into a stripping zone;
    (e) introducing a stripping medium into said stripping zone and stripping said ethylene oxide from said absorbent by contacting the enriched absorbent with said stripping medium;
    (f) withdrawing said ethylene oxide from said stripping zone;
    (g) withdrawing a lean absorbent from said stripping zone;
    (h) passing said lean absorbent to a collection zone;
    (i) cooling the lean absorbent in said collection zone by vaporizing a portion of said absorbent by reducing the pressure in said collection zone by a jet ejector motivated by a gas;
    (j) introducing into said stripping zone as said stripping medium the gas used to motivate said jet ejector and said portion of vaporized absorbent; and
    (k) passing said cooled absorbent from said collection zone to said absorption zone.

2. The method of claim 1, wherein the absorbent is water and the jet ejector motivating gas is steam.

3. The method of claim 1, wherein said collection zone comprises a tank positioned and providing a large surface area of lean absorbent relative to the volume of lean absorbent therein.

4. An improved method for separating ethylene oxide from a gaseous mixture containing the same which comprises:
    (a) introducing said mixture into an absorption zone;
    (b) passing said mixture through said absorption zone in countercurrent contact with an aqueous absorbent and absorbing ethylene oxide from the mixture;
    (c) withdrawing the unabsorbed gases of said mixture from said absorption zone;
    (d) withdrawing said ethylene oxide enriched absorbent from said absorption zone;
    (e) introducing said ethylene oxide enriched absorbent into a stripping zone;
    (f) introducing a stripping medium into said stripping zone and stripping ethylene oxide from said ethylene oxide enriched absorbent by contacting the enriched absorbent with the stripping medium;
    (g) withdrawing ethylene oxide from said stripping zone;
    (h) withdrawing a lean absorbent from said stripping zone and cooling said lean absorbent by heat exchange with a coolant;
    (i) introducing the lean absorbent into a collection zone;
    (j) cooling said lean absorbent in said collection zone by vaporizing a portion of said absorbent by reducing the pressure in said collection zone by a jet ejector motivated by a gas;
    (k) introducing into said stripping zone as said stripping medium, the gas used to motivate said jet ejector and said portion of said vaporized absorbent; and
    (l) passing the lean absorbent from said collection zone to said absorption zone.

5. The method of claim 4, wherein said absorbent is water and said jet ejector motivating gas is steam.

6. The method of claim 4, wherein said collection zone comprises a tank positioned and providing a large surface area of lean absorbent relative to the volume of lean absorbent therein.

References Cited by the Examiner

UNITED STATES PATENTS

| | | | |
|---|---|---|---|
| 2,295,462 | 9/1942 | Forman | 62—169 |
| 2,447,834 | 8/1948 | Balcar | 55—71 |
| 2,470,657 | 5/1949 | Simonds | 62—270 |
| 2,649,166 | 8/1953 | Porter et al. | 55—42 |
| 2,756,241 | 7/1956 | Courter | 260—348 |
| 2,762,453 | 9/1956 | Alexander | 55—44 |
| 2,775,600 | 12/1956 | Maslan | 260—348 |

FOREIGN PATENTS

| | | |
|---|---|---|
| 606,016 | 9/1960 | Canada. |
| 533,054 | 2/1941 | Great Britain. |

REUBEN FRIEDMAN, *Primary Examiner.*